United States Patent [19]
Brown et al.

[11] Patent Number: 6,056,098
[45] Date of Patent: May 2, 2000

[54] VISCOUS FLUID COUPLING AND IMPROVED VALVE ASSEMBLY THEREFOR

[75] Inventors: Richard J. Brown; William E. Koch, both of Marshall, Mich.

[73] Assignee: Borg-Warner Automotive, Inc., Troy, Mich.

[21] Appl. No.: 09/018,188

[22] Filed: Feb. 4, 1998

[51] Int. Cl.[7] .................................................. F16D 31/00
[52] U.S. Cl. ...................................... 192/58.61; 192/58.8
[58] Field of Search ............................... 192/58.61, 58.8, 192/58.66, 58 B, 82 T

[56] References Cited

U.S. PATENT DOCUMENTS

| | | | |
|---|---|---|---|
| 3,856,122 | 12/1974 | Leichliter | 192/58 B |
| 4,346,797 | 8/1982 | Bopp | 192/58 B |
| 4,846,325 | 7/1989 | Mohan | 192/58.61 |
| 4,960,191 | 10/1990 | Lembert et al. | 192/58 B |
| 5,014,836 | 5/1991 | Harima et al. | 192/58.8 |
| 5,090,533 | 2/1992 | Inoue | 192/58.8 X |
| 5,152,383 | 10/1992 | Boyer et al. | 192/58 B |
| 5,511,643 | 4/1996 | Brown | 192/58.61 |
| 5,722,523 | 3/1998 | Martin | 192/58.61 |

*Primary Examiner*—Charles A Marmor
*Assistant Examiner*—Roger Pang

[57] ABSTRACT

A fluid coupling device is disclosed of the type having an output coupling assembly (13) and an input coupling member (11). Control of the flow of viscous fluid between a reservoir chamber (35) and an operating chamber (33) is by rotation of a valve arm (43), to cover or uncover a fill opening (45). Rotation of the valve arm is affected by an actuator assembly (61). A raised portion (79) on a plate (73) attached to an armature (67) biases the valve arm (43) into sealing engagement with a surface (31) which defines a fill port (45,89), thus reducing fluid leakage from the reservoir (35) back into the operating chamber (33). A portion (85) which covers the fill port includes a dimple (91) which is disposed within the fill opening when the valve arm is in its closed position (FIG. 5). As the valve arm begins to move toward its open position (FIG. 6), the dimple (91) causes a camming and axial separation of the valve arm from the adjacent surface, to reduce the undesirable results of viscous drag on the valve arm.

7 Claims, 5 Drawing Sheets

VISCOUS FLUID COUPLING AND IMPROVED VALVE ASSEMBLY THEREFOR

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to viscous fluid couplings, and more particularly, to such couplings which are used to drive vehicle radiator cooling fans, wherein the engagement or disengagement of the viscous fluid coupling is controlled in response to a remotely sensed condition, such as coolant temperature.

Although the present invention is not limited to use in a viscous fluid coupling which is controlled "remotely", the use of the invention is especially advantageous in such couplings, and the invention will be described in connection therewith.

Viscous fluid couplings have been in commercial use for many years to drive vehicle radiator cooling fans, especially on vehicles such as automobiles and light trucks. The use of such viscous couplings has been widespread, and quite desirable because such couplings can operate in either an engaged condition, or a disengaged condition, depending upon a sensed temperature condition. Most of the fluid couplings (viscous fan drives) which have been in commercial use include some form of temperature-sensing bimetallic element which senses ambient air temperature adjacent the fan drive, and controls valving within the fan drive in response to the sensed temperature, to achieve either the engaged or the disengaged condition, as is appropriate.

In certain vehicle applications, it has become desirable to sense directly the temperature of the liquid coolant entering the radiator ("top tank" temperature), and to control the viscous fan drive in response to the coolant temperature, whereby the responsiveness of the fan drive is improved, when compared to the conventional fan drive which senses the ambient air temperature.

In order to improve the ability to control such remote-sensing fan drives, it has been considered desirable to convert the sensed temperature into an electrical signal, and to control the engagement of the fan drive by means of that electrical signal. Such electrical control also makes it possible to incorporate more sophisticated logic in the control system. U.S. Pat. No. 5,152,383, assigned to the assignee of the present invention, and incorporated herein by reference, discloses a remote-sensing viscous fan drive in which there is electromagnetic control, by means of variable reluctance, of a rotatable armature, relative to a stationary housing, thereby controlling the rotary position of a valve element in the fan drive, to either cover or uncover a fluid inlet port.

In the device of the referenced patent, the electromagnetic control includes a tethered housing through which extends an armature shaft, connected to the valve element of the fan drive. The valve element illustrated therein is of fairly conventional construction. Among the trade-offs involved in the design of such a fan drive is the need, on the one hand, to have a good seal between the valve and the adjacent surface defining the fill port (to minimize "morning sickness"), and the need, on the other hand, to be able to rotate the valve element without requiring an excessively large and expensive electromagnetic actuator. As is well known to those skilled in the art, those two objectives are generally contradictory, e.g., increasing the sealing force of the valve element results in the need for more torque to rotate the valve element. Conventionally, improving the sealing of the valve member has involved tighter tolerances on the various components, which adds to the overall cost of the coupling device, an approach which is undesirable. Also, improving the sealing can have a negative impact on response time, i.e., the time required for the coupling device to move from an engaged condition to a disengaged condition, or vice versa.

BRIEF SUMMARY OF THE INVENTION

Accordingly, it is an object of the present invention to provide an actuator assembly for a fluid coupling device which improves the seal between the valve element and the adjacent surface defining the fill port.

It is a more specific object of the present invention to provide such an actuator assembly which accomplishes the above-stated object, but without substantial increase in the torque required to rotate the valve member, and without the need to tighten the tolerances on the various components of the actuator assembly.

The above and other objects are accomplished by the provision of a fluid coupling device of the type including a first rotatable coupling assembly defining an axis of rotation, the first coupling assembly including a first coupling member and a cover member cooperating to define a fluid chamber therebetween. A valve means is associated with the first coupling assembly and is disposed to separate the fluid chamber into a fluid operating chamber and a fluid reservoir chamber. A second rotatable coupling member is disposed in the fluid operating chamber and is rotatable relative to the first coupling member, the first coupling assembly cooperating with the second coupling member to define a viscous shear space therebetween. The valve means is operable to control the flow of fluid between the reservoir chamber and the operating chamber, and the valve means includes a plate-like portion disposed generally perpendicular to the axis of rotation, and defining a fluid inlet port, and a valve member comprising a thin, generally flat member disposed to move in a plane parallel to the plate-like portion, and closely spaced thereto. The valve member is movable between an open position permitting fluid flow through the inlet port, and a closed position substantially blocking fluid flow through the inlet port. An actuator assembly is operably associated with the first coupling assembly and with the valve member, and is operable to move the valve member between the open and closed positions. The actuator assembly includes a rotatable armature member and means operable to rotate the armature member in response to variations in an input signal.

The improved fluid coupling device is characterized by the valve member being fixed to the armature member at an attachment location transversely offset from the axis of rotation. The valve member includes a port covering portion adapted to cover the inlet port when the valve member is in the closed position, the port covering portion being disposed diametrically opposite the attachment location, about the axis of rotation. One of the armature member and the valve member includes a biasing portion disposed axially between the armature member and the valve member, and radially between the axis of rotation and the attachment location, and operable to bias the port covering portion into sealing engagement with the plate-like portion.

DETAILED DESCRIPTION OF THE PREFERRED EMBODIMENT

Figure 1:
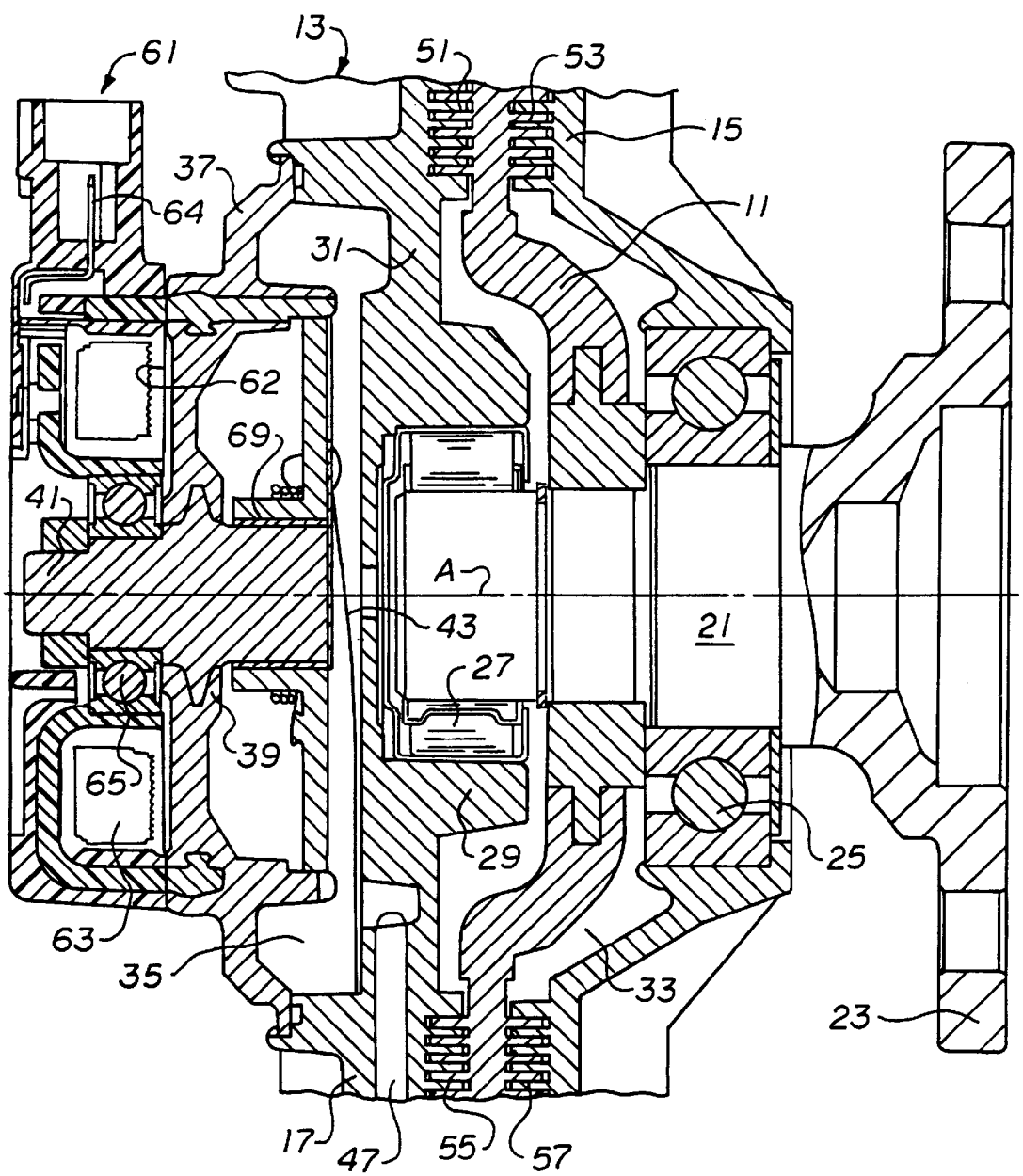
FIG. 1 is a fragmentary, axial cross-section of a viscous fluid coupling and electromagnetic actuator assembly in accordance with the present invention.

Referring now to the drawings, which are not intended to limit the invention, FIG. 1 illustrates one preferred form of a viscous fluid coupling (viscous fan drive) of the type with which the present invention may be utilized. The fluid coupling illustrated in FIG. 1 may be made in accordance with the teachings of the above-incorporated U.S. Pat. No. 5,152,383. It should be understood by those skilled in the art that the improved valve arrangement of the invention may also be utilized with various other types of viscous fluid couplings.

The fluid coupling of FIG. 1 includes an input coupling member, generally designated 11, and an output coupling assembly, generally designated 13. The output coupling assembly 13 includes a die-cast housing member 15 and a die-cast cover member 17, the members 15 and 17 being secured together by a rollover of the outer periphery of the cover member 17, as is well known in the art. The fluid coupling is adapted to be driven by a liquid cooled engine and, in turn, drives a radiator cooling fan (not shown herein). The fan may be attached to the housing member 15 by means of a plurality of threaded nuts (also not shown herein). It will be understood however, that the use of the present invention is not limited to any particular configuration of fluid coupling, or any particular application thereof, except as specifically noted hereinafter. The fluid coupling is shown fragmentarily in FIG. 1, for ease of illustration, and it should be understood that the outer radial portions of the coupling which are not shown may be merely conventional in construction and function.

The fluid coupling includes an input shaft 21 on which the input coupling member 11 is mounted. The input shaft 21 is rotatably driven, typically by means of a flange 23, which may be bolted to a mating flange of an engine water pump. The input shaft 21 functions as a support for the inner race of a bearing set 25, which is seated on the inside diameter of the housing member 15. The forward end (left end in FIG. 1) of the input shaft 21 is received within a bearing set 27, which is disposed within an opening defined by a radially inner hub portion 29 of the cover member 17. As a result, rotation of the input shaft causes rotation of the input coupling member 11.

The housing member 15 and the cover member 17 cooperate to define a fluid chamber which is separated, by means of a plate-like portion 31 of the cover member 17, into a fluid operating chamber 33, and a fluid reservoir chamber 35. Thus, it may be seen that the input coupling member 11 is disposed within the fluid operating chamber 33. The cover member 17 has a generally annular reservoir-defining cover member 37, which is disposed to be generally concentric about an axis of rotation A of the coupling device, and further defines a generally annular shaft support portion 39. Non-rotatably disposed within the shaft support portion 39 is a ferromagnetic valve shaft 41, extending outwardly (to the left in FIG. 1) through the cover member 37. In connection with the subsequent description of the present invention, the valve shaft 41 will also be referred to as an "armature shaft", for reasons which will become apparent. Disposed adjacent the inner end (right end in FIG. 1) of the valve shaft 41 is a valve arm 43, which will be described in greater detail subsequently. Movement of the valve arm 43 controls the flow of fluid from the reservoir chamber 35 to the operating chamber 33, through a fill opening 45 (see FIG. 5) formed in the valve plate 31.

Figure 2:
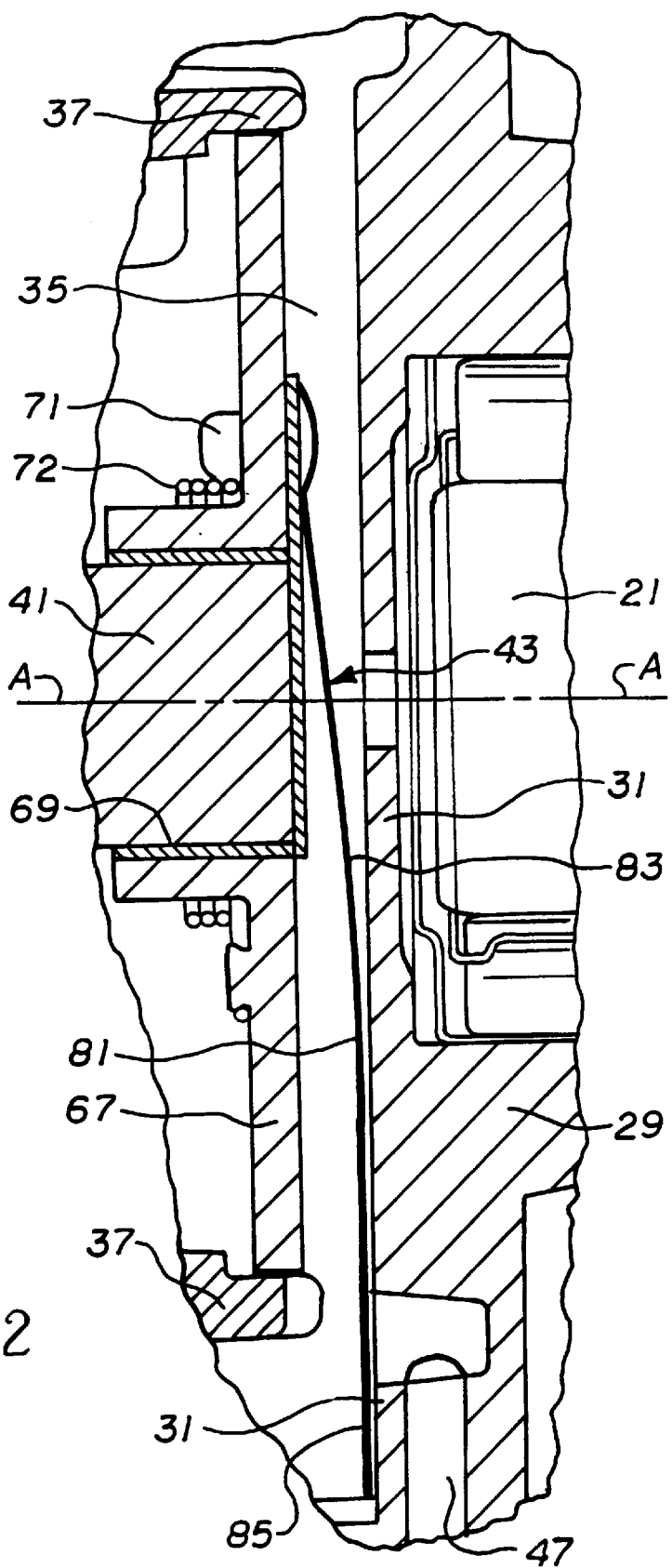
FIG. 2 is an enlarged, fragmentary, axial cross-section similar to FIG. 1, illustrating the improved valving of the present invention.

The cover member 17 defines an axial passage (not shown herein) in communication with the fluid operating chamber 33, and a generally radial passage 47, which provides fluid communication from the axial passage to the fluid reservoir chamber 35. Disposed adjacent the axial passage is a wiper or pumping element (also not shown herein), operable to engage the relatively rotating fluid in the operating chamber 33, and generate a localized region of relatively higher fluid pressure. Therefore, the wiper is operable continually to pump a small quantity of fluid back into the fluid reservoir chamber 35, through the axial passage and the radial passage 47, as is well known to those skilled in the fluid coupling art. In FIGS. 1 and 2, the valve arm 43 and the radial passage 47 are both shown, in the same plane, for ease of illustration, but it should be understood that they are not actually in the same plane, but instead, are circumferentially offset from each other.

In the subject embodiment of the invention, and referring again to FIG. 1, the input coupling member 11 includes forward and rearward surfaces which define pluralities of annular lands 51 and 53, respectively. The adjacent surfaces of the cover member 17 and housing member 15 form pluralities of annular lands 55 and 57, respectively. The lands 51 and 55 and the lands 53 and 57 are interdigitated to define therebetween forward and rearward serpentine-shaped viscous shear spaces, which may also be referred to hereinafter by the reference numerals 51–55 and 53–57. It is believed that in view of the above-incorporated U.S. patents, those skilled in the art can fully understand the construction and operation of the part of the fluid coupling illustrated in FIG. 1, and described so far, including the various flow paths for the viscous fluid contained therein. When torque is transmitted from the vehicle engine by means of the input shaft 21, to the input coupling member 11, the result is a shearing of the viscous fluid contained in the shear spaces 51–55 and 53–57, resulting in the transmission of torque to the output coupling assembly 13 and to the cooling fan.

Referring still to FIG. 1, attached to the cover member 17 is an actuator assembly, generally designated 61, and disposed adjacent a forward surface 62 of the cover member 37. The assembly 61 may be referred to as being "remote sensing" because it is responsive to an electrical input signal transmitted from a remote location at which changes in a predetermined condition are sensed, with the changes in the predetermined condition being represented by changes in the electrical signal transmitted to the actuator assembly 61. Typically the predetermined condition being sensed is the temperature of the liquid coolant in the vehicle engine block. The assembly 61 is referred to as an "actuator" assembly because it accomplishes the actuation of the valve arm 43 in response to the changes in the electrical input signal. More specifically, the function of the actuator assembly 61 is to rotate the valve arm 43 away from its normal position covering the fill opening 45 (the disengaged condition of the fluid coupling) toward a position in which the valve arm 43 uncovers the fill opening 45 (the engaged condition), as the temperature of the coolant increases. The construction and function of the actuator assembly 61 may be better understood by reference to above-incorporated U.S. Pat. No. 5,152,383, and because details of the actuator assembly 61 are not an essential feature of the present invention, there will not be a detailed description thereof.

Referring still to FIG. 1, it may be seen that the actuator assembly 61 is generally C-shaped in axial section, to accommodate therein an electromagnetic coil 63 which, as is well known to those skilled in the art, is typically wound on a plastic bobbin. The coil 63 receives an electrical input signal by means of a lead 64, which will be understood hereinafter also to represent the input signal, The actuator assembly 61 is in engagement with an outer race of a ball bearing set 65, the inner race of which is disposed about the valve shaft 41.

Figure 5:
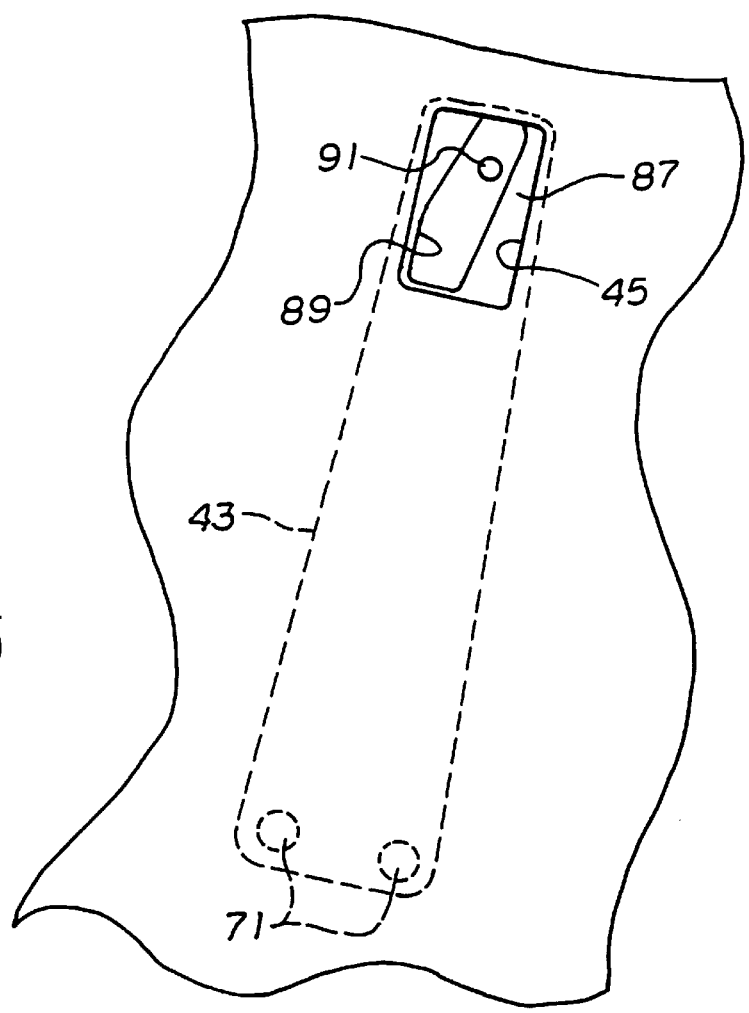
FIG. 5 is an enlarged, fragmentary, transverse view illustrating one aspect of the present invention, with the valve member in its closed position.

Disposed about the right end of the shaft 41 (in FIG. 1) is a ferromagnetic armature assembly, generally designated 67. Disposed between the ferromagnetic shaft 41 and the ferromagnetic armature 67 there is preferably a non-ferrous bearing surface or bearing sleeve 69, comprising a low-friction material such as a bronze or ceramic material. The valve arm 43, which will be described in greater detail subsequently, is attached to a transverse surface of the armature 67 by means of a pair of rivets 71, such that the valve arm 43 is fixed to the armature 67, and rotates therewith, in a manner to be described subsequently. Disposed about a cylindrical portion of the armature member 67 is a torsional return spring 72, the function of which is to bias the armature, and thus the valve member 43 toward its closed position as shown in FIG. 5. In the subject embodiment, and by way of example only, it is only the return spring 72 that biases the valve arm 43 toward the closed position, such that it is important to minimize extraneous forces like viscous drag acting on the valve arm 43.

Figure 4:
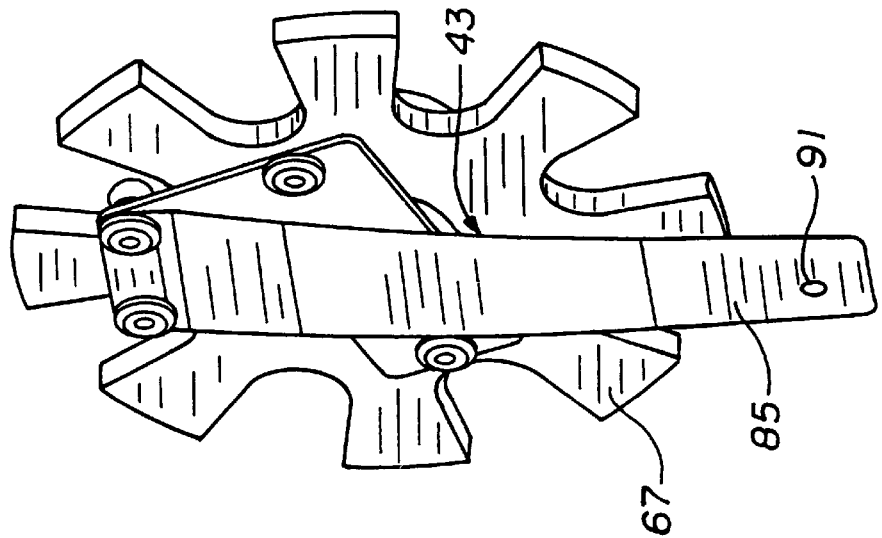
FIG. 4 is an assembled, perspective view, similar to FIG. 3, and on the same scale.
Figure 3:
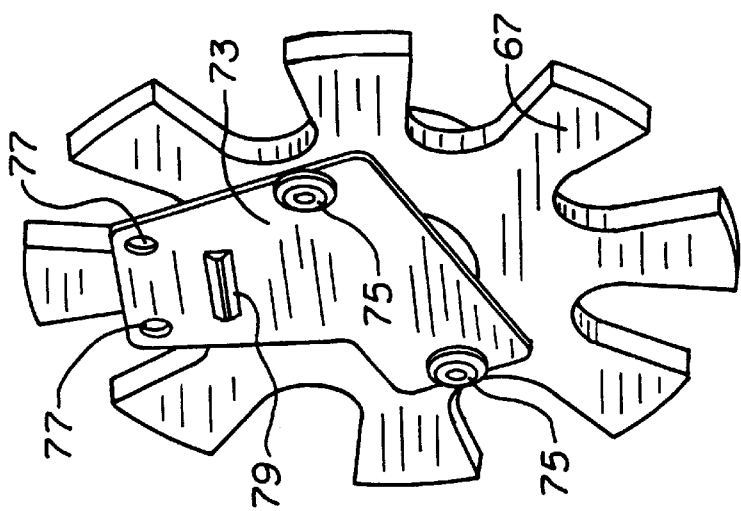
FIG. 3 is an exploded, perspective view of the armature and valve member, made in accordance with the present invention.
Figure 3:
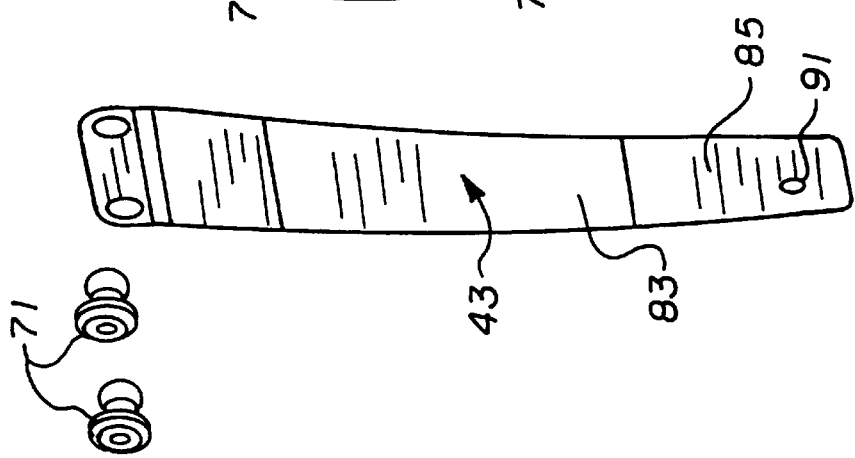

Referring now to FIGS. 3 and 4, in conjunction with FIG. 2, the armature member 67 may be made in accordance with the teachings of above-incorporated U.S. Pat. No. 5,152, 383, although it should be understood that the present invention is not so limited. Attached to the armature member 67 is a separate stamped plate 73, shown herein as being attached by means of a pair of rivets 75. The plate 73 also includes a pair of holes 77, adapted to receive the rivets 71, such that the holes 77 and rivets 71 together comprise an attachment location for the valve arm 43, relative to the armature 67. It should be understood that for most purposes, references to the armature 67 will mean and include the separate plate member 73, and that within the scope of the invention, the armature 67 and plate 73 could comprise a single, unitary member.

In accordance with one important aspect of the invention, the plate member 73 includes a raised portion 79, which is preferably disposed radially between the attachment location 71,77 and the axis of rotation A. When the valve arm 43 is attached to the armature 67 and plate 73, by means of the holes 77 and rivets 71, the raised portion 79 engages a forward surface 81 (see FIG, 2) of the valve arm 43, which also includes a rearward surface 83. The valve arm 43 includes a portion 85 which is disposed to cover the fill port 45, and thus may also be referred to as a "port covering portion" 85. The effect of the raised portion 79 is to bias the port covering portion 85 into fairly tight, sealing engagement with the surface of the plate-like portion 31, the surface also bearing the reference numeral "31" hereinafter. The improved sealing of the valve arm 43, and specifically, the portion 85 against the surface 31, results in less fluid leakage from the reservoir chamber 35 into the operating chamber 33, during those times when idle (disengaged) operation is desired. Of nearly equal importance is the fact that this improved sealing is accomplished in a manner which does not involve the need for tighter tolerances on the various components.

Figure 6:
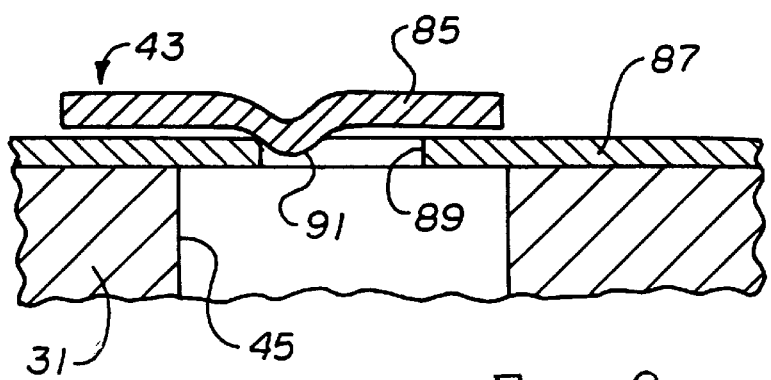
FIG. 6 is an enlarged, fragmentary, axial cross-section, with the valve member beginning to lift axially, prior to moving to its open position.

Referring now also to FIGS. 5 and 6, another aspect of the present invention will be described. In the subject embodiment, and by way of example only, the fill port 45 defined by the plate-like portion 31 is covered by a thin, stamped plate 87 (which is visible through the opening 45 in FIG. 5). The plate 87 defines an opening 89 which is the actual fill port. The port covering portion 85 of the valve arm 43 includes a small protuberance (or "dimple") 91, disposed on the rearward surface 83 of the valve arm. The dimple 91 will function in the manner of a cam during movement of the valve arm 43, from its closed position (FIG. 5), as it begins (FIG. 6) to move toward its open position.

Figure 7:
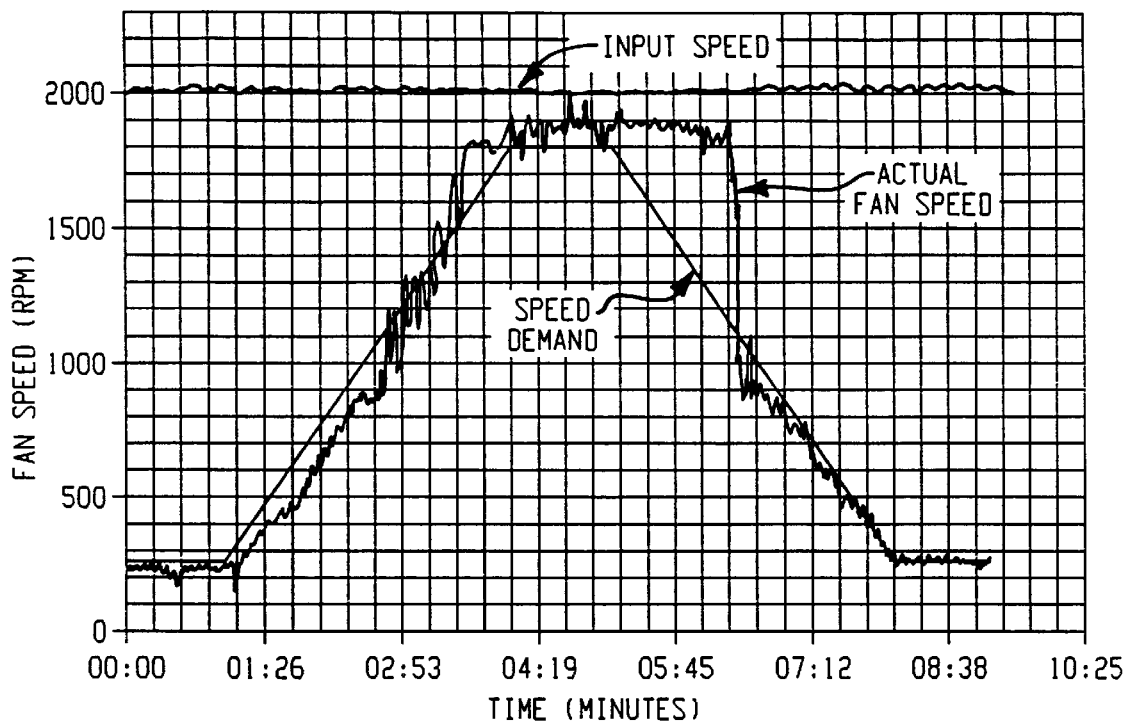
FIG. 7 is a graph of fan speed, in rpm, versus time, in minutes for the viscous coupling of the present invention, but without the feature illustrated in FIG. 5

As is well known to those skilled in the art of viscous couplings, there is a viscous drag (surface tension) exerted on the valve arm 43 as an attempt is made to rotate the valve arm, as it is in face-to-face engagement with the surface 31. This viscous drag substantially increases the torque which must be applied by the actuator 61, in order to move the valve arm 43 toward the open position, and increases the torque which must be applied by the return spring 72, in order to move the valve arm 43 toward the closed position. As may best be seen in the graph of FIG. 7, showing operation without the dimple 91, the viscous drag on the valve arm 43 results in erratic operation, i.e., excessive deviation of actual fan speed from the theoretical fan speed ("speed demand") commanded by the input signal to the coil 63. It may be seen that the greatest deviation of the actual fan speed from the speed demand is as the valve arm 43 begins to move from its nearly fully open position toward its closed position, At this point, there is the maximum surface area of engagement of the valve arm and the adjacent surface of the stamped plate 87.

Referring now primarily to FIG. 6, as the valve arm 43 moves from its closed (disengaged) position toward its open (engaged) position, the dimple 91, which normally extends into the fill opening 89, engages the side (or actually, the corner) of the fill opening 89. The result is a "camming" action whereby the engagement of the dimple 91 causes the port covering portion 85 to be lifted from the surface of the plate 87, thus breaking the surface tension as the portion 85 not only moves rotationally, but also axially away from the plate 87 by the axial dimension of the dimple 91. Breaking the surface tension reduces the viscous drag on the valve arm 43, with the result that less torque is required to be exerted by the actuator 61 to move the valve arm. Once the valve arm 43 reaches its open position, the dimple 91 maintains the valve arm spaced apart from the adjacent surface, again by the axial dimension of the dimple 91, thereby minimizing the tendency for viscous drag to occur during subsequent movement of the valve arm.

Figure 8:
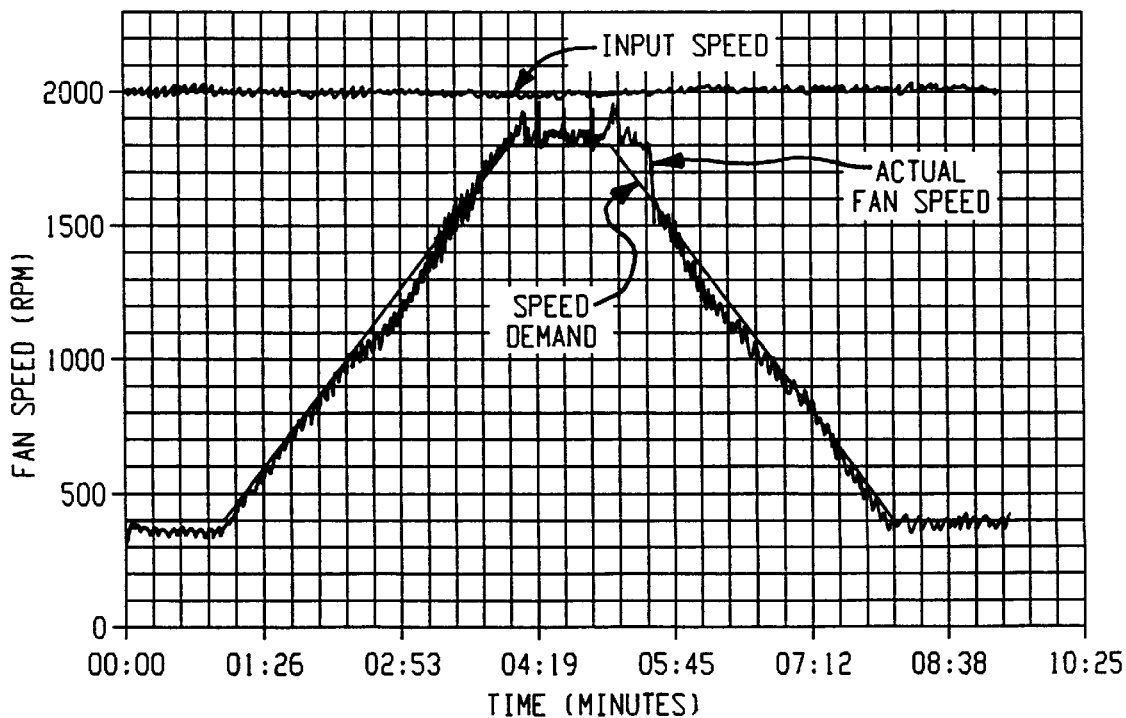
FIG. 8 is a graph of fan speed, in rpm, versus time, in minutes for the viscous coupling of the present invention, including the feature of FIG. 5.

The practical result of this reduced drag may be seen in FIG. 8, wherein the deviation of the actual fan speed from the desired, or theoretical, is substantially reduced. Thus, with the present invention, it is possible to achieve greater sealing force on the valve arm, to reduce leakage, but at the same time, overcome the one disadvantage of the increased sealing force, by reducing the viscous drag on the valve arm as it opens.

Although no dimensions are provided herein for either the raised portion 79 or the dimple 91, it is believed to be within the ability of those skilled in the art, based upon a reading and understanding of this specification, to select the appropriate dimensions for any particular fan drive and design of the valve assembly. This selection would have to take into account factors such as the thickness and flexibility of the valve arm, the distance from the rivets 71 to the fill port 89, etc.

Although the dimple 91 has been illustrated and described in conjunction with the raised portion 79 biasing the valve arm into sealing engagement with the adjacent surface (of either the portion 31 or the plate 87), the use of the dimple 91 is not so limited. Instead, the dimple 91 could be used is any fan drive valve arm application wherein it is desired to reduce the viscous drag on the valve arm, thus reducing the amount of torque required to rotate the valve arm. It is also not an essential feature of the invention that the dimple 91 be located within the fill port 89 (or 45) when the valve arm is closed. In certain fan drive designs, reducing torque required to rotate the valve arm may be such an overriding objective (even more so than good sealing), that the dimple 91 may be located such that it is never within the area of the fill port. In that case, the dimple will insure that there is always an axial separation between the adjacent surface and the valve arm. For example, the dimple could be located either radially inward or radially outward relative to the fill port.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A fluid coupling device of the type including a first rotatable coupling assembly defining an axis of rotation, said first coupling assembly including a first coupling member and a cover member cooperating to define a fluid chamber therebetween; valve means associated with said first coupling assembly and disposed to separate said fluid chamber into a fluid operating chamber and a fluid reservoir chamber; a second rotatable coupling member disposed in said fluid operating chamber, and being rotatable relative to said first coupling member, and cooperating therewith to define a viscous shear space therebetween, said valve means being operable to control the flow of fluid between said reservoir chamber and said operating chamber, said valve means including a plate-like portion disposed generally perpendicular to said axis of rotation, and defining a fluid inlet port, and a valve member comprising a thin, generally flat member disposed to move in a plane parallel to said plate-like portion, and closely spaced thereto, said valve member being movable between an open position permitting fluid flow through said inlet port, and a closed position substantially blocking fluid flow; an actuator assembly operably associated with said first coupling assembly and with said valve member and operable to move said valve member between said open and closed positions, said actuator assembly including a rotatable armature member and means operable to rotate said armature member in response to variations in an input signal; characterized by:

(a) said valve member being fixed to said armature member at an attachment location transversely offset from said axis of rotation;

(b) said valve member including a port covering portion adapted to cover said inlet port when said valve member is in said closed position, said port covering portion being disposed diametrically opposite said attachment location, about said axis of rotation; and (c) one of said armature member and a separate plate member fixed relative to said armature member including a biasing portion comprising a raised portion disposed axially between said armature member and said valve member, and radially between said axis of rotation and said attachment location, and operable to bias said port covering portion into sealing engagement with said plate-like portion.

2. A fluid coupling device as claimed in claim 1, characterized by said port covering portion of said valve member including a cam portion extending from a rearward surface of said port covering portion into said fluid inlet port, when said valve member is in said closed position, whereby rotation of said valve member from said closed position to said open position causes said cam portion to engage said plate-like portion, thereby lifting said port covering portion out of sealing engagement with the adjacent surface of said plate-like portion.

3. A fluid coupling device as claimed in claim 1, characterized by said valve member being fixed relative to said armature by means of a plurality of rivets.

4. A fluid coupling device as claimed in claim 2, characterized by said valve member comprising a stamped, spring steel member, and said cam portion comprises a small protuberance formed during the process of stamping said valve member.

5. A fluid coupling device of the type including a first rotatable coupling assembly defining an axis of rotation, said first coupling assembly including a first coupling member and a cover member cooperating to define a fluid chamber therebetween; valve means associated with said first coupling assembly and disposed to separate said fluid chamber into a fluid operating chamber and a fluid reservoir chamber; a second rotatable coupling member disposed in said fluid operating chamber, and being rotatable relative to said first coupling member, and cooperating therewith to define a viscous shear space therebetween, said valve means being operable to control the flow of fluid between said reservoir chamber and said operating chamber, said valve means including a plate-like portion disposed generally perpendicular to said axis of rotation, and defining a fluid inlet port, and a valve member comprising a thin, generally flat member disposed to move in a plane parallel to said plate-like portion, and closely spaced thereto, said valve member being movable between an open position permitting fluid flow through said inlet port, and a closed position substantially blocking fluid flow; means operable to move said valve member between said open and closed positions; characterized by:

(a) said valve arm including a port covering portion covering said inlet port when said valve arm is in said closed position;

(b) one of said port covering portion of said valve member and said plate-like portion including a cam portion extending axially toward the other of said plate-like portion and said port covering portion, whereby, during at least a major portion of the rotation of said valve member between said closed position and said open position, said cam portion maintains said port covering portion axially out of sealing engagement with the adjacent surface of said plate-like portion, to reduce the viscous drag therebetween.

6. A fluid coupling device as claimed in claim 5, characterized by said valve member defining said cam portion extending axially toward said plate-like portion.

7. A fluid coupling device as claimed in claim 5, characterized by said cam portion being disposed within said fluid inlet port, when said valve member is in said closed position, whereby rotation of said valve member from said closed position to said open position causes said cam portion to engage said plate-like portion, thereby lifting said port covering portion out of sealing engagement with the adjacent surface of said plate-like portion.

* * * * *